United States Patent
An et al.

(10) Patent No.: US 9,604,673 B2
(45) Date of Patent: Mar. 28, 2017

(54) REAR VEHICLE BODY REINFORCING STRUCTURE

(71) Applicant: Hyundai Motor Company, Seoul (KR)

(72) Inventors: Yong Dok An, Anyang-si (KR); Dae Seung Kim, Gwacheon-si (KR); Mun Soo Cha, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/871,590

(22) Filed: Sep. 30, 2015

(65) Prior Publication Data

US 2016/0347373 A1    Dec. 1, 2016

(30) Foreign Application Priority Data

May 27, 2015  (KR) .................. 10-2015-0074278

(51) Int. Cl.
*B62D 25/08*  (2006.01)
*B62D 21/15*  (2006.01)

(52) U.S. Cl.
CPC ................. *B62D 21/152* (2013.01)

(58) Field of Classification Search
CPC ..... B60J 5/10; B60J 5/101; B60J 5/107; B60J 5/108
USPC ...... 296/203.01, 203.04, 193.08, 146.8, 106, 296/56, 186.3
See application file for complete search history.

(56) References Cited

U.S. PATENT DOCUMENTS

| | | | | |
|---|---|---|---|---|
| 4,045,075 A | * | 8/1977 | Pulver | B62D 21/08 280/798 |
| 5,141,280 A | * | 8/1992 | Gerrard | B60J 10/244 296/146.8 |
| 5,954,364 A | | 9/1999 | Nechushtan | |
| 6,371,767 B1 | * | 4/2002 | Libby | G09B 25/02 296/205 |
| 7,044,535 B2 | * | 5/2006 | Durand | B62D 23/005 296/203.01 |
| 7,347,475 B2 | * | 3/2008 | Ikemoto et al. | B62D 25/087 296/193.08 |
| 9,010,847 B2 | * | 4/2015 | Katou et al. | B62D 25/087 296/193.08 |
| 2006/0192375 A1 | * | 8/2006 | Davis et al. | B60G 3/06 280/781 |
| 2014/0159428 A1 | * | 6/2014 | Katou et al. | B62D 25/087 296/193.08 |

FOREIGN PATENT DOCUMENTS

| | | |
|---|---|---|
| JP | 2010-247610 A | 11/2010 |
| KR | 10-2007-0049408 A | 5/2007 |
| KR | 10-0828388 B1 | 5/2008 |
| WO | WO 01/81154 A2 | 11/2001 |

* cited by examiner

*Primary Examiner* — Dennis H Pedder
(74) *Attorney, Agent, or Firm* — Morgan, Lewis & Bockius LLP

(57) ABSTRACT

A rear vehicle body reinforcing structure may include a rear reinforcing member deployed on a periphery of a vehicle body rear door opening and configured to be coupled to a rear vehicle body, in which the rear reinforcing member is opened upward in a height direction of a vehicle.

12 Claims, 2 Drawing Sheets

REAR VEHICLE BODY REINFORCING STRUCTURE

CROSS-REFERENCE TO RELATED APPLICATION

The present application claims priority to Korean Patent Application No. 10-2015-0074278 filed May 27, 2015, the entire contents of which is incorporated herein for all purposes by this reference.

BACKGROUND OF THE INVENTION

Field of the Invention

The present invention relates to a rear vehicle body reinforcing structure of a vehicle, and more particularly, to a rear vehicle body reinforcing structure which reinforces a vehicle body rear door opening opened/closed by a tail gate in a hatchback type space frame vehicle body.

Description of Related Art

In the related art, a so-called space frame vehicle body constituting a vehicle body by connecting frame type vehicle body members to each other includes a front vehicle body positioned at the front in the longitudinal direction of a vehicle and constituting an engine room, a central vehicle body positioned at the center in the longitudinal direction of the vehicle and constituting a passenger room, and a rear vehicle body positioned at the rear in the longitudinal direction of the vehicle and constituting a trunk room.

A rear vehicle body of a midship vehicle in which the engine room is positioned at the rear in the longitudinal direction of the vehicle has a form in which multiple vehicle body frames are connected in a thrust structure in a space between rear side members extended in the longitudinal direction of the vehicle and deployed at both left and right sides in the width direction of the vehicle and a roof of the vehicle and some vehicle body frames having the thrust structure are connected with a rear shock absorber.

In a rear vehicle body structure of the space frame vehicle body, in the case of a hatch back type, a vehicle body rear door opening opened/closed by a tail gate is provided and a reinforcing structure to appropriately reinforce strength of a vehicle body rear door opening needs to be developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear vehicle body reinforcing structure which can maintain a smooth opening/closing operation of a tail gate and a stable closing posture of the tail gate by appropriately reinforcing peripheral strength of a vehicle body rear door opening opened/closed by the tail gate in a space frame type rear vehicle body structure.

According to various aspects of the present invention, a rear vehicle body reinforcing structure may include a rear reinforcing member deployed on a periphery of a vehicle body rear door opening and configured to be coupled to a rear vehicle body, in which the rear reinforcing member is opened upward in a height direction of a vehicle.

The rear reinforcing member may have a "U" shape which is opened upward in the height direction of the vehicle.

The rear vehicle body may include rear side members at both left and right sides, which extend in a longitudinal direction of the vehicle and are deployed at both left and right sides in a width direction of the vehicle, rear shock absorber mounting reinforcing members at both left and right sides, which are coupled to tops of the rear side members at both left and right sides in the height direction of the vehicle, a rear cross lower reinforcing member connecting the rear side members at both left and right sides in the width direction of the vehicle, quarter center reinforcing members at both left and right sides, of which a first end is coupled to the rear shock absorber mounting reinforcing members at both left and right sides and a second end is coupled to center pillars extended in the height direction of the vehicle and deployed at both left and right sides in the width direction of the vehicle, quarter upper pillar members at both left and right sides, of which a first end is coupled to the rear shock absorber mounting reinforcing members at both left and right sides and a second end is coupled to roof side rail members extended in the longitudinal direction of the vehicle and deployed at both left and right sides in the width direction of the vehicle, and a rear cross upper reinforcing member connecting the quarter upper pillar members at both left and right sides.

The vehicle body rear door opening may be formed by the rear cross upper reinforcing member, the quarter upper pillar members at both left and right sides, and the rear side members at both left and right sides.

The rear reinforcing member may have an annular structure in which both ends in a longitudinal direction of the rear reinforcing member are coupled to the rear cross upper reinforcing member.

Two first extension members may protrude at a predetermined portion of the rear reinforcing member in the longitudinal direction and the two first extension members may be coupled to the rear shock absorber mounting reinforcing members at both left and right sides.

Two second extension members may integrally protrude and extend at both left and right portions in a width direction of the rear reinforcing member and the two second extension members may be coupled to tops of rear fore-ends of the rear side members at both left and right sides in the longitudinal direction of the vehicle, respectively.

The two second extension members may be deployed below two first extension members in the height direction of the vehicle.

A third extension member may protrude and extend at a central portion of the rear reinforcing member in the width direction and the third extension member may be connected with the rear cross lower reinforcing member.

Each of the first extension members, the second extension members, and the third extension members may protrude to a front in the longitudinal direction of the vehicle.

A fourth extension member may extend to protrude to a rear in the longitudinal direction of the vehicle at a central portion of the rear reinforcing member in the width direction of the vehicle, and a tail gate latch may be configured to be disposed in the fourth extension member.

The fourth extension member may be deployed on a same line as the third extension member in the longitudinal direction of the vehicle.

The rear reinforcing member may be manufactured by a circular pipe

According to various embodiments of the present invention, by a rear vehicle body reinforcing structure, a rear reinforcing member having a substantially "U" shape is connected to each of a rear cross upper reinforcing member positioned at an upper portion in the height direction of a vehicle and extended in the width direction of the vehicle, a rear cross lower reinforcing member connecting rear side members at both left and right sides extended in the longitudinal direction of the vehicle and deployed at both left and right sides in the width direction of the vehicle in the width direction of the vehicle, and a rear shock absorber mounting reinforcing member reinforcing mounting strength of the rear shock absorber and the rear reinforcing member and the rear cross upper reinforcing member are together formed in an annular structure to effectively increase structural strength of a rear vehicle body.

Further, a vehicle body rear door opening opened/closed by a tail gate is provided in the annular structure and a periphery of the vehicle body rear door opening is reinforced by the annular structure to increase peripheral strength of the vehicle body rear door opening, smoothly achieve an opening/closing operation of the tail gate, and maintain a stable closing posture of the tail gate.

Moreover, the rear reinforcing member is formed by a circular pipe, and as a result, manufacturing a shape such as a 3D shape, or the like is easy and a rear vehicle body can be easily reinforced by low manufacturing cost.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
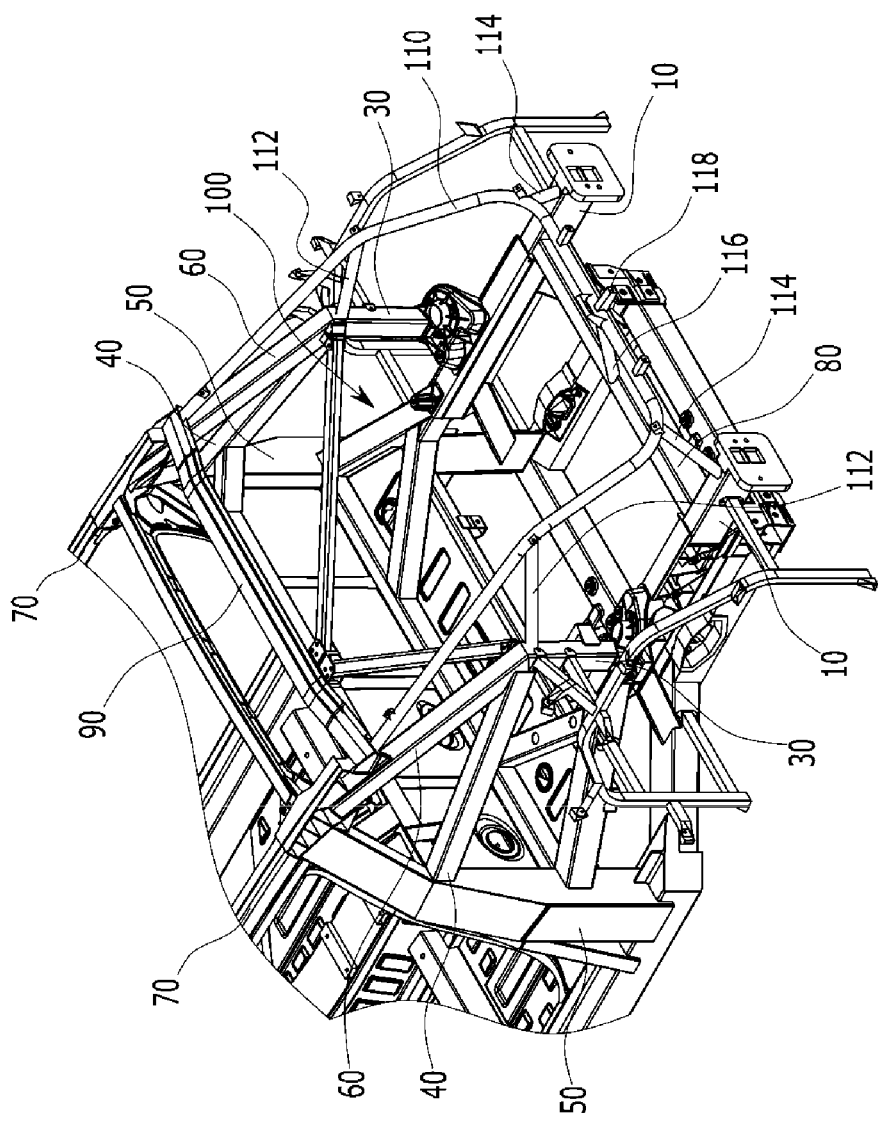
FIG. 1 is a perspective view of an exemplary rear vehicle body reinforcing structure according to the present invention.
Figure 2:
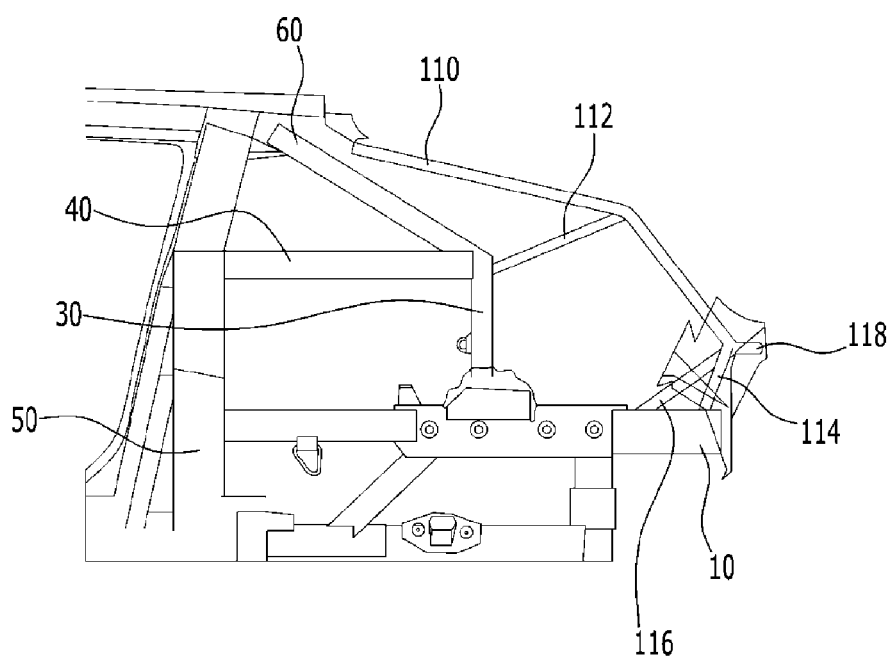
FIG. 2 is a side view of the exemplary rear vehicle body reinforcing structure according to the exemplary embodiment of the present invention.

Referring to FIG. 1, a rear vehicle body adopting a reinforcing structure according to various embodiments of the present invention as a frame type in which vehicle body frame members are connected to each other may include rear side members 10 extended in the longitudinal direction of a vehicle and deployed at both left and right sides in the width direction of the vehicle.

Rear shock absorber mounting reinforcing members 30 at both left and right sides are mounted on the tops of the rear side members 10 at both left and right sides in the height direction of the vehicle, one end of a quarter center reinforcing member 40 is coupled to the rear shock absorber mounting reinforcing member 30 at both left and right sides, and the other end of the quarter center reinforcing member 40 is extended in the height direction of the vehicle and coupled to center pillars 50 deployed at both left and right sides in the width direction of the vehicle.

Further, one end of a quarter upper pillar member 60 is coupled to the rear shock absorber mounting reinforcing member 30 and the other end of the quarter upper pillar member 60 is coupled to roof side rail members 70.

A rear cross lower reinforcing member 80 connects the rear side members 10 at both left and right sides to increase structural strength of a rear vehicle body and a rear cross upper reinforcing member 90 connects the quarter upper pillar members 60 at both left and right sides to increase the structural strength of the rear vehicle body.

An opening surrounded by the rear cross upper reinforcing member 90, and the quarter upper pillar members 60 at both left and right sides and the rear side members 10 at both left and right sides forms a vehicle body rear door opening 100 opened/closed by a tail gate.

A rear vehicle body reinforcing structure according to various embodiments of the present invention, which reinforces a periphery of the vehicle body rear door opening 100 to increase the structural strength of the rear vehicle body may include a rear reinforcing member 110 deployed on the periphery of the vehicle body rear door opening 100.

The rear reinforcing member 110 may have a substantially "U" shape in which one side is opened.

Both ends of the rear reinforcing member 110 may be coupled to the rear cross upper reinforcing members 70, respectively and two first extension members 112 may be formed at a predetermined portion of the rear reinforcing member 110 in the longitudinal direction to protrude.

Two first extension members 112 are coupled to the rear shock absorber mounting reinforcing member 30, and as a result, the rear reinforcing member 110 may be connected to the rear shock absorber mounting reinforcing member 30 through the two first extension members 112.

Two first extension members 112 may be deployed to be symmetric to each other at both left and right sides in the width direction and extended to form an acute angle together with the rear reinforcing member 110.

Further, two second extension members 114 integrally protrude and extend at both left and right portions in the width direction at a lower portion in the height direction of the vehicle rather than the predetermined portion of the rear reinforcing member 110 in the width direction, that is, the first extension member 112 and two second extension members 114 may be coupled to the tops of rear fore-ends of the rear side members 10 in the longitudinal direction of the vehicle.

Moreover, a third extension member 116 protrudes and extends substantially at a central portion of the rear reinforcing member 110 in the width direction to be connected with the rear cross lower reinforcing member 80.

The first extension members 112, the second extension members 114, and the third extension members 116 are connected with respective members constituting the rear vehicle body, respectively to reinforce the periphery of the vehicle body rear door opening 100 of the rear vehicle body.

Each of the first extension members 112, the second extension members 114, and the third extension members 116 protrudes to the front in the longitudinal direction of the vehicle.

A fourth extension member 118 may extend to protrude to the rear in the longitudinal direction of the vehicle substantially at the central portion in the width direction.

The fourth extension member 118 may be deployed substantially on the same line as the third extension member 116 in the longitudinal direction of the vehicle.

Since a tail gate latch may be mounted and supported on the fourth extension member 118, a stable closing posture of the tail gate may be maintained by increasing mounting strength of the tail gate latch.

The rear reinforcing member 110 may be manufactured by a circular pipe having a substantially circular cross-section.

When the rear reinforcing member 110 is manufactured by the circular pipe, a 3D shape may be easily manufactured through a bending process, and the like, the rear reinforcing member 110 may be manufactured at low manufacturing cost.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear vehicle body reinforcing structure comprising:
    a rear reinforcing member deployed on a periphery of a vehicle body rear door opening and configured to be coupled to a rear vehicle body,
    wherein the rear reinforcing member is opened upward in a height direction of a vehicle, and
    wherein the rear vehicle body includes:
        rear side members at both left and right sides, which extend in a longitudinal direction of the vehicle and are deployed at both left and right sides in a width direction of the vehicle;
        rear shock absorber mounting reinforcing members at both left and right sides, which are coupled to tops of the rear side members at both left and right sides in the height direction of the vehicle;
        a rear cross lower reinforcing member connecting the rear side members at both left and right sides in the width direction of the vehicle;
        quarter center reinforcing members at both left and right sides, of which a first end is coupled to the rear shock absorber mounting reinforcing members at both left and right sides and a second end is coupled to center pillars extended in the height direction of the vehicle and deployed at both left and right sides in the width direction of the vehicle;
        quarter upper pillar members at both left and right sides, of which a first end is coupled to the rear shock absorber mounting reinforcing members at both left and right sides and a second end is coupled to roof side rail members extended in the longitudinal direction of the vehicle and deployed at both left and right sides in the width direction of the vehicle; and
        a rear cross upper reinforcing member connecting the quarter upper pillar members at both left and right sides.

2. The rear vehicle body reinforcing structure of claim 1, wherein the rear reinforcing member has a "U" shape which is opened upward in the height direction of the vehicle.

3. The rear vehicle body reinforcing structure of claim 1, wherein:
    the vehicle body rear door opening is formed by the rear cross upper reinforcing member, the quarter upper pillar members at both left and right sides, and the rear side members at both left and right sides.

4. The rear vehicle body reinforcing structure of claim 1, wherein:
    the rear reinforcing member has an annular structure in which both ends in a longitudinal direction of the rear reinforcing member are coupled to the rear cross upper reinforcing member.

5. The rear vehicle body reinforcing structure of claim 4, wherein:
    two first extension members protrude at a predetermined portion of the rear reinforcing member in the longitudinal direction and the two first extension members are coupled to the rear shock absorber mounting reinforcing members at both left and right sides.

6. The rear vehicle body reinforcing structure of claim 5, wherein:
    two second extension members integrally protrude and extend at both left and right portions in a width direction of the rear reinforcing member and the two second extension members are coupled to tops of rear fore-ends of the rear side members at both left and right sides in the longitudinal direction of the vehicle, respectively.

7. The rear vehicle body reinforcing structure of claim 6, wherein:
    the two second extension members are deployed below two first extension members in the height direction of the vehicle.

8. The rear vehicle body reinforcing structure of claim 6, wherein:

a third extension member protrudes and extends at a central portion of the rear reinforcing member in the width direction and the third extension member is connected with the rear cross lower reinforcing member.

9. The rear vehicle body reinforcing structure of claim 8, wherein:
each of the first extension members, the second extension members, and the third extension members protrudes to a front in the longitudinal direction of the vehicle.

10. The rear vehicle body reinforcing structure of claim 9, wherein:
a fourth extension member extends to protrude to a rear in the longitudinal direction of the vehicle at a central portion of the rear reinforcing member in the width direction of the vehicle, and a tail gate latch is configured to be disposed in the fourth extension member.

11. The rear vehicle body reinforcing structure of claim 10, wherein:
the fourth extension member is deployed on a same line as the third extension member in the longitudinal direction of the vehicle.

12. The rear vehicle body reinforcing structure of claim 1, wherein:
the rear reinforcing member is manufactured by a circular pipe.

* * * * *